Jan. 2, 1923. 1,441,018.
A. C. MECKLENBURG.
SAFETY VALVE FOR HIGH PRESSURE LINES.
FILED JUNE 25, 1920.
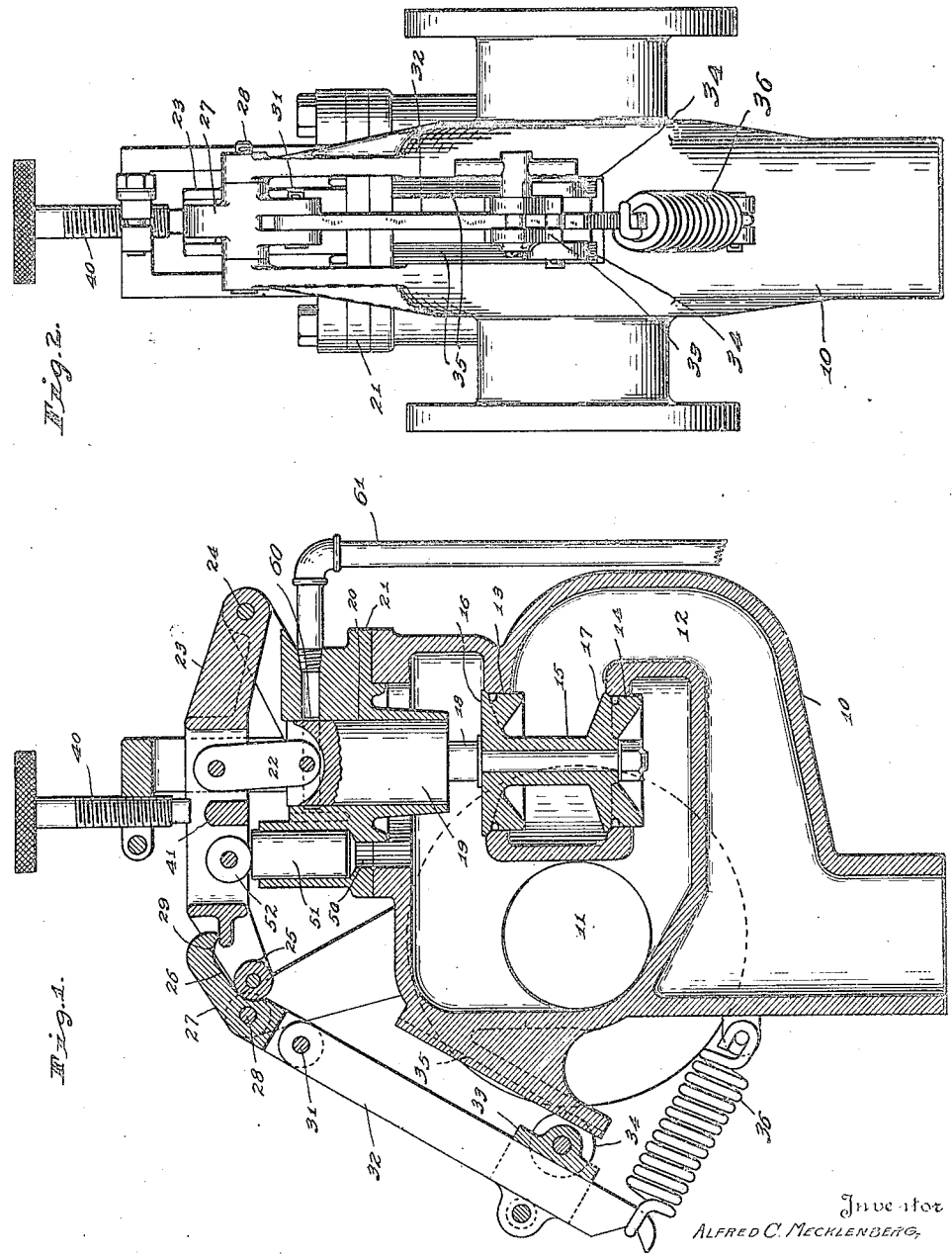
Inventor
ALFRED C. MECKLENBURG,
By Hood & Schley
Attorney Patented Jan. 2, 1923.

1,441,018

UNITED STATES PATENT OFFICE.

ALFRED C. MECKLENBURG, OF INDIANAPOLIS, INDIANA, ASSIGNOR TO STUTZ FIRE ENGINE COMPANY, OF INDIANAPOLIS, INDIANA, A CORPORATION OF INDIANA.

SAFETY VALVE FOR HIGH-PRESSURE LINES.

Application filed June 25, 1920. Serial No. 391,646.

*To all whom it may concern:*

Be it known that I, ALFRED C. MECKLENBURG, a citizen of the United States, residing at Indianapolis, in the county of Marion and State of Indiana, have invented a new and useful Safety Valve for High-Pressure Lines, of which the following is a specification.

The object of my invention is to produce a valve which may be introduced into a high-pressure water line, such as that produced by a fire engine, of such character that, whenever the outlet is closed or decreased beyond a desired minimum, and the pressure of water within the line exceeds a desired maximum, the valve will be automatically opened under the excessive pressure so as to permit outflow through a by-pass so long as the normal outlet is closed or reduced beyond a minimum and which shall automatically close so that the entire delivery may be through the normal outlet whenever said outlet is properly opened.

The accompanying drawings illustrate my invention. Fig. 1 is a transverse section; Fig. 2 a side elevation.

In the drawings, 10 indicates a main casing designed to be placed within the delivery line of a pressure system and to furnish a straight-away passage therethrough through the chamber 11. Chamber 11 is provided with a by-pass 12, entry to which is obtained through openings 13 and 14, normally closed by a valve 15, having a portion 16 which seats in opening 13, and portion 17 which seats in opening 14. The portion 16 necessarily exceeds in diameter the portion 17, so that the parts may be assembled. Valve 15 carries a stem 18 which is provided at its upper end by a piston portion 19, fitting bore 20 formed in a cap 21, closing the upper open end of casing 10. Pivoted to the upper end of portion 19 is a link 22 which is pivoted at its upper end to an arm 23 pivoted at 24 on cap 21. Arm 23 carries at its free end a roller 25 which engages a cam surface 26, formed on a lever 27 pivoted at 28 on casing 10. At the end of cam 26, I form a shoulder 29 which limits movement of lever 23 relative to lever 27. Pivoted at 31 to lever 27 is a lever 32 carrying a cross head 33 which is longitudinally adjustable on lever 32 and carries a pair of rollers 34, 34 which roll upon a track 35 formed on casing 10, the arrangement being such that the effective leverage exertible through lever 32 may be changed by shifting cross head 33 on said lever. Attached to the outer end of lever 32 is a tension spring 36, said spring being also attached to casing 10.

Adjustably mounted on cap 21 is a stop screw 40 which is arranged in the path of movement of a cross arm 41 carried by lever 23, so as to limit the upward movement of lever 23.

By careful proportioning of the parts 16, 17 and 19, it is possible to provide sufficient excess area at the lower end of portion 17 to cause a normal opening tendency of the valve 15, due to pressure within the chamber 11, but in practice, this is found to be somewhat uncertain in operation, and therefore, in order to insure a positive opening of valve 15 upon the acquirement of sufficient pressure within chamber 11, I provide a passage 50 which communicates at its lower end with chamber 11 and has a piston 51 mounted in its upper end, said piston engaging a roller 52 carried by lever 23, the arrangement being such that the normal tendency of pressure within chamber 11, acting upon valve 15 and piston 51, is to move lever 23 upwardly and thus, through roller 25 and cam 26, to stress spring 36, said spring serving, so long as excess pressure is not attained, within chamber 11, to keep valve 15 closed and prevent outlet through by-pass 12. Whenever pressure within chamber 11 reaches a desired maximum, however, lever 23 is moved upwardly against the action of spring 36 and outflow through by-pass 12 permitted until the pressure is either reduced by reducing the speed of the pump or by opening the normal outlet, whereupon, in either case, spring 36, acting through levers 32 and 27, cam 26, roller 25 and lever 23, serves to restore the valve 15 to normally closed position.

Cam 26 is so formed that the resistance of spring 36 to upward movement of lever 23 is substantially uniform throughout its range of operation.

In order to avoid the necessity of packing the plunger 19 and yet avoiding any undesirable leakage around the outer end of this plunger, I form an annular shallow chamber 60 near the outer end of the bore 20 and connect this annular chamber to a waste pipe 61.

I claim as my invention:

1. In a pressure relief valve, the combination with a main casing having a primary passage therethrough and a by-pass, of a valve normally closing said by-pass, a lever connected to said valve, a cam lever co-acting with said first-mentioned lever, an operating lever connected with said cam lever, a shiftable fulcrum for said operating lever, a spring acting upon said operating lever in a direction to normally close the valve, an independent plunger accessible to pressure within the interior of the casing and acting upon the first-mentioned lever to open the valve, and an adjustable stop for limiting the opening movement of the valve.

2. In a pressure relief valve, the combination with a main casing having a primary passage therethrough and a by-pass, of a valve normally closing said by-pass, a lever connected to said valve, a cam lever co-acting with said first-mentioned lever, an operating lever connected with said cam lever, a spring acting upon said operating lever in a direction to normally close the valve, an independent plunger accessible to pressure within the interior of the casing and acting upon the first-mentioned lever to open the valve, and an adjustable stop for limiting the opening movement of the valve.

3. In a pressure relief valve, the combinaaion with a main casing having a primary passage therethrough and a by-pass, of a valve normally closing said by-pass, a lever connected to said valve, a cam lever co-acting with said first-mentioned lever, an operating lever connected with said cam lever, a shiftable fulcrum for said operating lever, a spring acting upon said operating lever in a direction to normally close the valve, and an independent plunger accessible to pressure within the interior of the casing acting upon the first-mentioned lever to open the valve.

4. In a pressure relief valve, the combination with a main casing having a primary passage therethrough and a by-pass, of a valve normally closing said by-pass, a lever connected to said valve, a cam lever co-acting with said first-mentioned lever, an operating lever connected with said cam lever, a spring acting upon said operating lever in a direction to normally close the valve, and an independent plunger accessible to pressure within the interior of the casing and acting upon the first-mentioned lever to open the valve.

In witness whereof, I have hereunto set my hand at Indianapolis, Indiana, this third day of June, A. D. one thousand nine hundred and twenty.

ALFRED C. MECKLENBURG.